United States Patent
Miller et al.

(10) Patent No.: US 6,800,262 B1
(45) Date of Patent: Oct. 5, 2004

(54) METHOD FOR MAKING A URANIUM CHLORIDE SALT PRODUCT

(75) Inventors: William E. Miller, Naperville, IL (US); Zygmunt Tomczuk, Lockport, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 478 days.

(21) Appl. No.: 09/874,966

(22) Filed: Jun. 7, 2001

(51) Int. Cl.[7] .............................................. C01G 43/08
(52) U.S. Cl. ............................ 423/257; 423/3; 423/253
(58) Field of Search .............................. 423/2, 3, 491, 423/253, 254, 257

(56) References Cited

U.S. PATENT DOCUMENTS 2,797,142 A * 6/1957 Katz .......................... 423/257
4,880,506 A * 11/1989 Ackerman et al. ............. 205/44
5,322,545 A * 6/1994 Gilchrist ....................... 75/399
5,356,605 A * 10/1994 Tomczuk et al. ........... 423/251

* cited by examiner

*Primary Examiner*—Ngoc-Yen Nguyen
(74) *Attorney, Agent, or Firm*—Bradley W. Smith; Mark P. Dvorscak; Paul A. Gottlieb

(57) ABSTRACT

The subject apparatus provides a means to produce $UCl_3$ in large quantities without incurring corrosion of the containment vessel or associated apparatus. Gaseous Cl is injected into a lower layer of Cd where $CdCl_2$ is formed. Due to is lower density, the $CdCl_2$ rises through the Cd layer into a layer of molten LiCl—KCL salt where a rotatable basket containing uranium ingots is suspended. The $CdCl_2$ reacts with the uranium to form $UCl_3$ and Cd. Due to density differences, the Cd sinks down to the liquid Cd layer and is reused. The $UCl_3$ combines with the molten salt. During production the temperature is maintained at about 600° C. while after the uranium has been depleted the salt temperature is lowered, the molten salt is pressure siphoned from the vessel, and the salt product LiCl—KCl-30 mol % $UCl_3$ is solidified.

3 Claims, 1 Drawing Sheet

METHOD FOR MAKING A URANIUM CHLORIDE SALT PRODUCT

CONTRACTUAL ORIGIN OF THE INVENTION

The United States Government has rights in this invention pursuant to Contract No. W-31-109-ENG-38 between the U.S. Department of Energy and the University of Chicago.

FIELD OF THE INVENTION

This invention is a method for making uranium chloride, $UCl_3$, by combining $Cl_2$ with Cd to form $CdCl_2$ which reacts with Uranium to form $UCl_3$.

BACKGROUND OF THE INVENTION

There is an ongoing problem concerning the development of a method of producing large quantities of uranium chloride ($UCl_3$) which is not corrosive to the containment vessel. The use of gaseous HCL as the chlorinating agent results in extensive levels of corrosion in ferrous metal containers and any associated ferrous components. To counter this, the use of non-corrosive reactants was explored. It is known that $CdCl_2$ is not a corrosive chlorinating agent and can be combined with uranium to form $UCl_3$. However, if $CdCl_2$ is purchased in its commercial form and then purified, the process becomes too expensive and also creates Cd metal waste. An alternate method involves the use of pyrophoric $UH_3$; however, to make large batches of $UCl_3$ requires large facility and equipment costs to meet the safety requirements, thus, resulting in the occurrence of a large financial outlay. On the other hand, Applicants have developed an alternate method by combining gaseous chlorine with liquid cadmium to form the $CdCl_2$ for use as the chlorinating agent with uranium to produce $UCl_3$ while not creating a large Cd waste residue since the Cd is continually recycled. Thus, the object of this invention is to provide an apparatus and method for the production of $UCl_3$ in a matrix salt, for instance LiCl—KCl eutectic, and in a manner which does not result in extensive corrosion of the containment vessel and associate manufacturing apparatus. Another objective is to provide for an apparatus and method which produces $UCl_3$ at a reasonable cost. Additional advantages, objects and novel features of the invention will become apparent to those skilled in the art upon examination of the following and by practice of the invention.

SUMMARY OF THE INVENTION

To achieve the foregoing and other advantages, this invention is an apparatus and method for producing $UCl_3$ without corroding the containment vessel or the components associated with the production of the $UCl_3$. To produce the $CdCl_2$, gaseous $Cl_2$ is introduced into liquid Cd which resides, due to density differences, under a molten salt, LiCl—KCl. Since $CdCl_2$ is insoluble in Cd and has a lower density, it will rise through the liquid Cd into the LiCl—KCl layer. A porous basket containing uranium is suspended in the molten salt layer. The $CdCl_2$ reacts with the uranium to form $UCl_3$ which is soluble in the molten salt and Cd which sinks due to density differences and recombines with the Cd pool under the molten salt. To maintain the molten state of the Cd and the salt, the temperature of the reactants are maintained at about 600° C. during chlorination process. After the reaction is complete, the temperature can be lowered to approximately 450 to 500° C. for pressure siphoning of the product salt from the vessel.

BRIEF DESCRIPTION OF THE DRAWINGS

The present invention is illustrated in the accompanying drawing where.

DETAILED DESCRIPTION OF THE INVENTION

Figure 1:
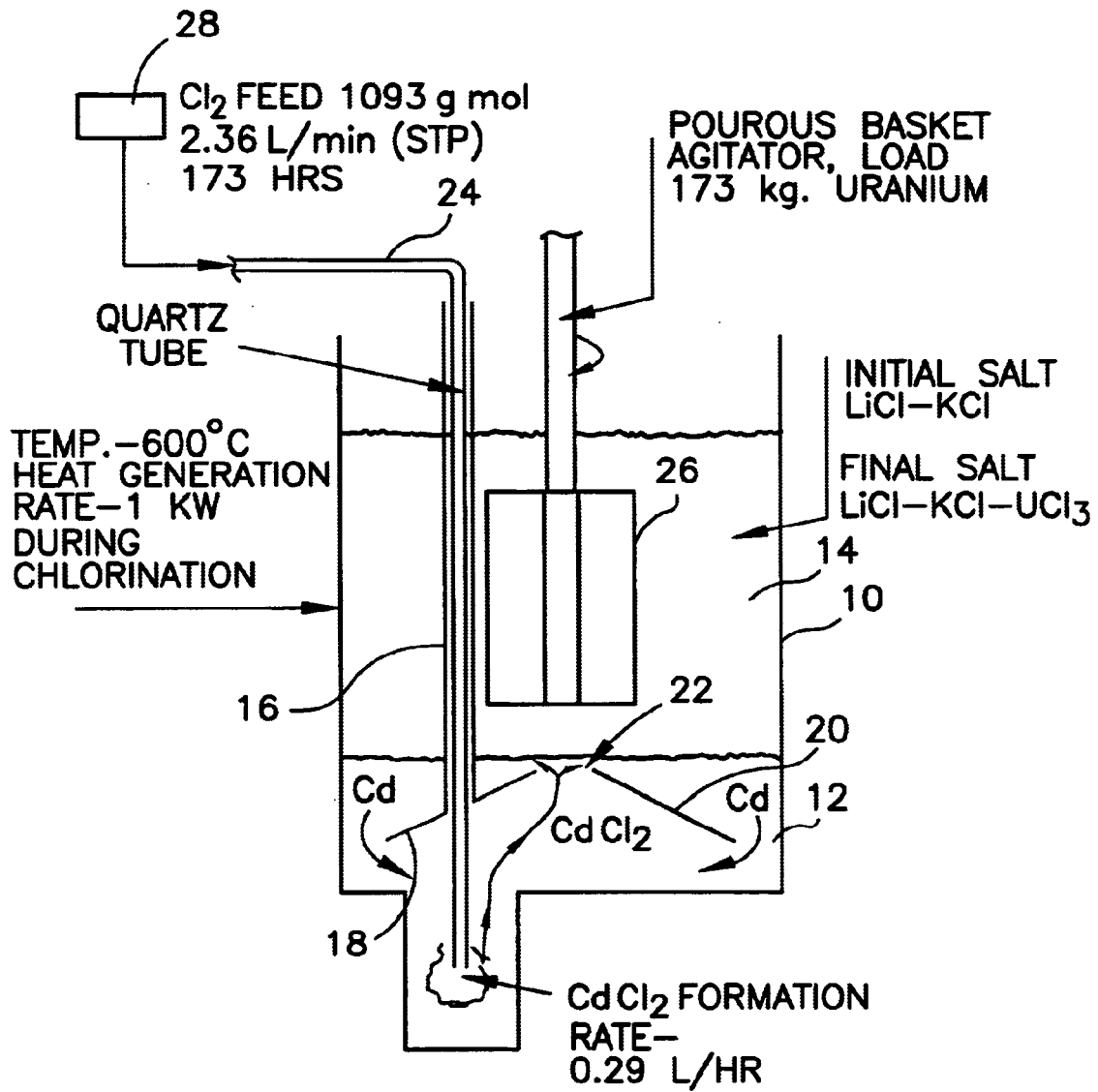
FIG. 1 is a diagram of the chlorinator apparatus.

FIG. 1 depicts a schematic of the apparatus for the chlorinator employed to formulate the $UCl_3$. As is shown in FIG. 1, the chlorination process is housed in a containment vessel 10. A layer of cadmium, Cd, 12 is the base layer within the vessel 10. The upper layer 14 is initially a $CdCl_2$ free salt such as LiCl—KCl. The chlorinator is kept at an operational temperature of approximately 600° C. which results in both layers being liquids. A hollow tube, preferably of a ferrous composition, penetrates the liquid salt 14 and terminates within the liquid Cd 12 while the opposing end remains above the surface of the liquid salt. In the preferred embodiment, the end of the tube 16 forms a baffle 18. A corresponding baffle 20 can be built into the container on the side opposing the tube 16. The baffles are arranged so that they slope upward to approximately the center of the vessel 10 and terminate so as to create a fixed opening 22 within the liquid Cd 12. A second hollow tube 24, preferably made of quartz, is threaded through tube 16. The lead end of the second tube 24 extends past the end of the first tube such that it is further into the liquid Cd while the opposing end is connected to a $Cl_2$ feed 28. The second tube 24 is used to transport a stream of gaseous $Cl_2$ into the liquid Cd where it combines with the liquid Cd to form $CdCl_2$. The solubility of Cd in $CdCl_2$ at 600° C. is 15 mol %. This allows the material at the $Cl_2$ nozzle or orifice to have reactant Cd present; thus, the $CdCl_2$ pool which forms around the nozzle should never be inert. Since the density, at 600° C., of $CdCl_2$ is 3.37 while that of Cd is 7.82 and since the solubility of $CdCl_2$ in Cd is near zero, the $CdCl_2$ should feed into the overlying salt layer. The baffles 18 and 20 serve to direct the flow of the $CdCl_2$ towards the center of the containment vessel 10. A porous basket 26 containing uranium, U, ingots is submerged in the liquid salt. The uranium reacts with the $CdCl_2$ in the following manner:

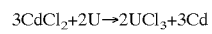

Since both of the reactions, to produce $CdCl_2$ and $2UCl_3+3Cd$, are exothermic, the rate of $Cl_2$ addition is controlled to produce heat at the 1 KW rate. The cooling rate of the vessel is designed to match this heat production rate in order to maintain the temperature of the interior of the vessel and its contents at approximately 600° C.

The porous basket 26 containing the uranium ingots is rotated in the salt causing mixing which is necessary to scrub off the $UCl_3$ and Cd, reaction products, from the uranium surface. The $UCl_3$ dissolves in the LiCl—KCl salt converting it to LiCl—KCl—$UCl_3$ as is shown above. The cadmium metal is essentially insoluble in the salt and is heavier than the salt which results in the Cd sinking and recombining with the Cd layer under the molten salt layer. The $Cl_2$ feed is halted prior to consumption of all of the uranium metal in the basket 26 in order to guarantee a low level of $CdCl_2$ in the product salt, LiCl—KCl—$UCl_3$. The residual concentration of Cd in the product salt should be <100 ppm. The equilibrium level of $CdCl_2$ in the salt when the uranium metal is present is $5\times10^{-4}$ mol fraction.

After the reaction is complete, the temperature can be lowered to 450°–500° C. for pressure siphoning of the product salt from the vessel 10. A salt heel together with the Cd phase will be left in the vessel 10. The next batch of LiCl—KCL is then added.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A method for the formation of $UCl_3$ including:

heating a containment vessel to approximately 600° C.;

establishing a base layer of cadmium in a base portion of the containment vessel where said cadmium layer is molten at 600° C.;

establishing a second initial layer of salt above the layer of cadmium where said salt layer is molten at 600° C.;

feeding chlorine gas through a hollow tube into the cadmium layer to form $CdCl_2$ which is less dense than the cadmium and thus, rises into the molten salt layer;

suspending a basket containing a plurality of uranium ingots in the molten salt layer in such a manner that the uranium ingots react with the $CdCl_2$ to form $UCl_3$ which is soluble in the molten salt;

providing sufficient reaction time to allow most of the uranium to react with the $CdCl_2$;

controlling a flow rate of $Cl_2$ so that heat generated by a pair of exothermic reactions, $Cd+Cl_2 \rightarrow CdCl_2$ and $3CdCl_2+2U \rightarrow 2UCl_3+3Cd$ which occur in the containment vessel is balanced by a heat removal rate from the containment vessel to maintain the temperature within the containment vessel at approximately 600° C.;

removing the basket from the salt layer;

cooling the containment vessel to between 450° C. and 500° C. and pressure siphoning a product salt containing the $UCl_3$ from the containment vessel leaving a small heel of salt and the cadmium.

2. The method of claim 1 wherein the initial salt layer is LiCl—KCL.

3. The method of claim 1 wherein the basket is rotated during the reaction process to clean off the cadmium and the $UCl_3$ from the surface of the uranium.

* * * * *